United States Patent
Abels et al.

(10) Patent No.: US 9,520,626 B2
(45) Date of Patent: Dec. 13, 2016

(54) EXPANDABLE STACKED PLATE HEAT EXCHANGER FOR A BATTERY UNIT

(71) Applicant: Dana Canada Corporation, Oakville (CA)

(72) Inventors: Kenneth M. A. Abels, Oakville (CA); Michael A. Martin, Hamilton (CA)

(73) Assignee: Dana Canada Corporation, Oakville, Ontario (CA)

( * ) Notice: Subject to any disclaimer, the term of this patent is extended or adjusted under 35 U.S.C. 154(b) by 0 days.

(21) Appl. No.: 14/845,409

(22) Filed: Sep. 4, 2015

(65) Prior Publication Data

US 2016/0072165 A1    Mar. 10, 2016

Related U.S. Application Data

(60) Provisional application No. 62/046,316, filed on Sep. 5, 2014.

(51) Int. Cl.
*H01M 10/6557* (2014.01)
*B23P 15/26* (2006.01)
(Continued)

(52) U.S. Cl.
CPC ........ *H01M 10/6557* (2015.04); *B23K 1/0012* (2013.01); *B23P 15/26* (2013.01);
(Continued)

(58) Field of Classification Search
CPC .............. H01M 10/6557; H01M 10/6555; H01M 10/613; H01M 10/625; H01M 2220/20; B23K 1/0012; B23P 15/26
See application file for complete search history.

(56) References Cited

U.S. PATENT DOCUMENTS 3,335,789 A    8/1967    Raskin
4,175,617 A    11/1979   Hahn et al.
(Continued)

FOREIGN PATENT DOCUMENTS

CA    1229377 A       11/1987
JP    2000048867 A    2/2000
(Continued)

OTHER PUBLICATIONS

International Search Report, mailing date Dec. 14, 2011 and Written Opinion dated Nov. 16, 2011 for Application No. PCT/CA2011/050620.
(Continued)

*Primary Examiner* — Stewart Fraser
(74) *Attorney, Agent, or Firm* — Marshall & Melhorn, LLC

(57) ABSTRACT

A heat exchanger for cooling battery cell containers in a battery unit is disclosed. The heat exchanger includes individual heat exchanger modules that are fluidly interconnected and spaced apart from each other so as to accommodate individual battery cell containers arranged between adjacent heat exchanger modules to form a battery unit. Each heat exchanger module is formed by a pair generally planar first and second heat exchanger plates having a main section and flexible inlet and outlet panels extending therefrom. The heat exchanger is formed by a stack of alternating first and second plates that are brazed together to form heat exchanger modules, the heat exchanger modules formed in the stack being interconnected by their inlet and outlet panels and expanded post-brazing by bending/flexing the inlet and outlet panels to provide adequate spacing or gaps between the modules to accommodate battery cell containers.

20 Claims, 14 Drawing Sheets

(51) Int. Cl.
  *H01M 10/613* (2014.01)
  *H01M 10/6555* (2014.01)
  *B23K 1/00* (2006.01)
  *H01M 10/625* (2014.01)

(52) U.S. Cl.
  CPC ..... *H01M 10/613* (2015.04); *H01M 10/6555* (2015.04); *H01M 10/625* (2015.04); *H01M 2220/20* (2013.01)

(56) References Cited

U.S. PATENT DOCUMENTS

| | | |
|---|---|---|
| 6,709,783 B2 | 3/2004 | Ogata et al. |
| 7,764,047 B2 | 7/2010 | Jeon et al. |
| 2004/0142238 A1 | 7/2004 | Asahina et al. |
| 2005/0089750 A1 | 4/2005 | Ng et al. |
| 2006/0115720 A1 | 6/2006 | Kim |
| 2008/0110595 A1 | 5/2008 | Palanchon |
| 2008/0311468 A1 | 12/2008 | Hermann et al. |
| 2011/0162820 A1 | 7/2011 | Weber et al. |
| 2011/0189525 A1 | 8/2011 | Palachon et al. |
| 2012/0028156 A1 | 2/2012 | Song et al. |
| 2012/0082880 A1 | 4/2012 | Koetting et al. |
| 2012/0237805 A1 | 9/2012 | Abels et al. |
| 2013/0143093 A1 | 6/2013 | Teng et al. |
| 2013/0244077 A1* | 9/2013 | Palanchon ................ F28F 3/12 429/120 |
| 2014/0017545 A1 | 1/2014 | Palanchon |
| 2014/0186661 A1 | 7/2014 | Payne |

FOREIGN PATENT DOCUMENTS

| | | |
|---|---|---|
| WO | 03071616 A2 | 8/2003 |
| WO | 2011094863 A1 | 8/2011 |

OTHER PUBLICATIONS

International Search Report and Written Opinion, mailing date Nov. 25, 2015 for Application No. PCT/CA2015/050852.

* cited by examiner

EXPANDABLE STACKED PLATE HEAT EXCHANGER FOR A BATTERY UNIT

CROSS-REFERENCE TO RELATED APPLICATION

This application claims priority to and the benefit of United States Provisional Patent Application No. 62/046,316 filed Sep. 5, 2014 under the title EXPANDABLE STACKED PLATE HEAT EXCHANGER FOR A BATTERY UNIT. The content of the above patent application is hereby expressly incorporated by reference into the detailed description of the present application.

TECHNICAL FIELD

This disclosure relates to heat exchangers used to dissipate heat in battery units.

BACKGROUND

Rechargeable batteries such as batteries made up of many lithium-ion cells can be used in many applications, including for example, electric propulsion vehicle ("EV") and hybrid electric vehicle ("HEV") applications. These applications often require advanced battery systems that have high energy storage capacity, the battery systems generating large amounts of heat that needs to be dissipated. Efforts are constantly being made to improve and/or facilitate the thermal management of these types of battery systems by providing heat exchangers that can address the thermal management requirements and that allow for improved manufacturing by offering features that facilitate manufacturing of the individual heat exchanger components and assembly of the heat exchanger in order to meet specific customer requirements and possibly reduce overall costs.

SUMMARY OF THE PRESENT DISCLOSURE

In accordance with an example embodiment of the present disclosure there is provided a heat exchanger for a battery unit, the heat exchanger comprising a plurality of heat exchanger modules each defining an internal flow passage, the heat exchanger modules each comprising a generally planar main section; an inlet panel defining an inlet manifold contact region and defining an internal inlet fluid passage in fluid communication with said internal flow passage of said main section; and an outlet panel defining an outlet manifold contact region and defining an internal outlet flow passage in fluid communication with said internal flow passage of said main section; the inlet and outlet panels each being joined to the main section of the heat exchanger module by a respective joining portion; wherein the inlet and outlet panels of adjacent heat exchanger modules in said plurality of heat exchanger modules are arranged in alignment with the inlet panels being interconnected at their respective inlet manifold contact regions with the internal inlet fluid passages of adjacent heat exchanger modules being in fluid communication with each other, and with the outlet panels being interconnected at their respective outlet manifold contact regions, the internal outlet fluid passages of adjacent heat exchanger modules being in fluid communication with each other; and wherein the inlet panels and outlet panels have a first position wherein the inlet and outlet panels are generally planar and extend in the same plane as said main section and a second position wherein said inlet and outlet panels extend out of the plane of said main section thereby spacing apart the main sections of adjacent heat exchanger modules forming gaps therebetween.

In accordance with another example embodiment of the present disclosure there is provided a battery unit comprising a plurality of battery cell containers; and a heat exchanger having a plurality of heat exchanger modules each defining an internal flow passage, each heat exchanger module being interleaved between adjacent battery cell containers and comprising a generally planar main section; an inlet panel defining an inlet manifold contact region and an internal inlet fluid passage in fluid communication with said internal flow passage of said main section; and an outlet panel defining an outlet manifold contact region and an internal outlet flow passage in fluid communication with said internal flow passage of said main section; the inlet and outlet panels each being joined to the main section of the heat exchanger module by a joining portion; wherein the inlet and outlet panels of adjacent heat exchanger modules are arranged in alignment with the inlet panels being interconnected at their respective inlet manifold contact regions and with the internal inlet fluid passages of adjacent heat exchanger modules being in fluid communication with each other, the outlet panels being interconnected at their respective outlet manifold contact regions with the internal outlet fluid passages being in fluid communication with each other; and wherein the inlet and outlet panels of each heat exchanger module each extend between the respective inlet and outlet manifold contact regions and the corresponding joining portion of the inlet and outlet panels, the inlet and outlet panels having a first position wherein the inlet and outlet panels are generally planar and extend in the same plane as said main section of the heat exchanger module and a second position wherein the inlet and outlet panels extend out of the plane of said main section of the heat exchanger module thereby spacing apart the main sections of adjacent heat exchanger modules forming gaps therebetween for receiving respective ones of said plurality of battery cell containers.

In accordance with yet another exemplary embodiment of the present disclosure there is provided a method of assembling a heat exchanger comprising providing a plurality of substantially planar heat exchanger modules that each define an internal flow passage, each heat exchanger module comprising a generally planar main section, an inlet panel, and an outlet panel, the inlet and outlet panels being joined to the main section of the heat exchanger module by a joining portion; an internal inlet fluid passage formed in said inlet panel in fluid communication with said internal flow passage; an internal outlet fluid passage formed in said outlet panel in fluid communication with said internal flow passage; wherein said inlet panel extends between said joining portion and a corresponding free end of the inlet panel; and wherein said outlet panel extends between said joining portion and a corresponding free end of the outlet panel; wherein each inlet panel and outlet panel comprises a fluid inlet opening and a fluid outlet opening formed therein for establishing fluid communication between adjacent inlet panels and adjacent outlet panels; arranging said plurality of substantially planar heat exchanger modules in a stack with the inlet panels and outlet panels of adjacent heat exchanger modules being in alignment such that the fluid outlet openings of one heat exchanger module are aligned with the fluid inlet openings of the adjacent heat exchanger module providing fluid communication therebetween; brazing together the inlet panels and outlet panels of said plurality of substantially planar heat exchanger modules in a localized area establishing fluid communication between said heat exchanger modules while the main sections of said heat exchanger modules remain unbounded; manipulating said inlet and outlet panels post-brazing so as to space apart the generally planar main sections of adjacent heat exchanger modules forming gaps therebetween.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1A:
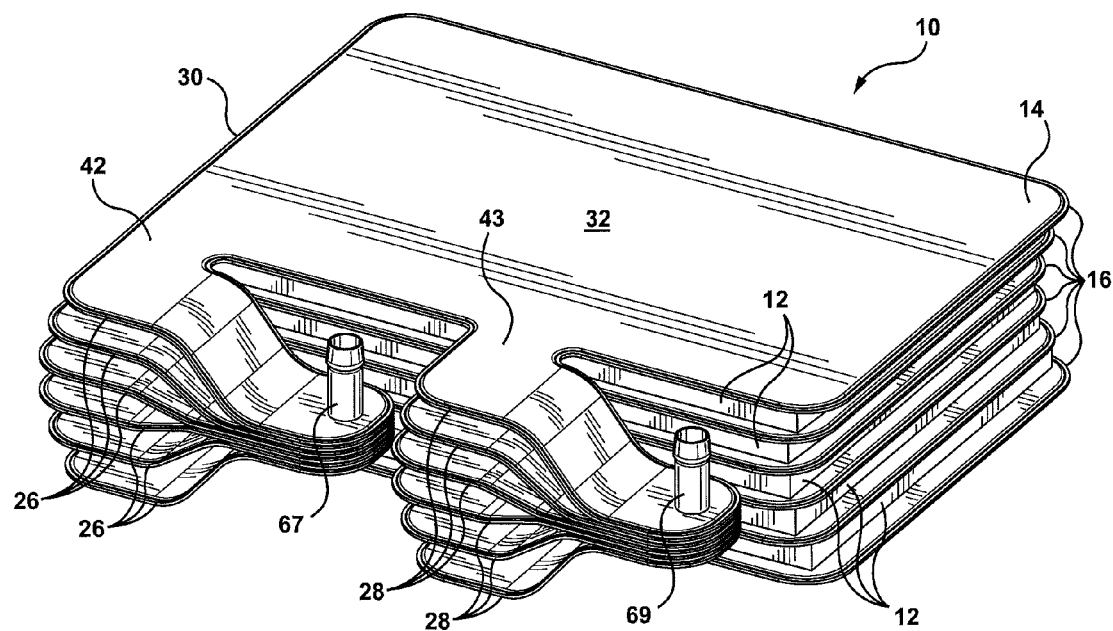
FIG. 1A is a front perspective view of a battery unit incorporating a heat exchanger according to an example embodiment of the present disclosure.
Figure 1B:
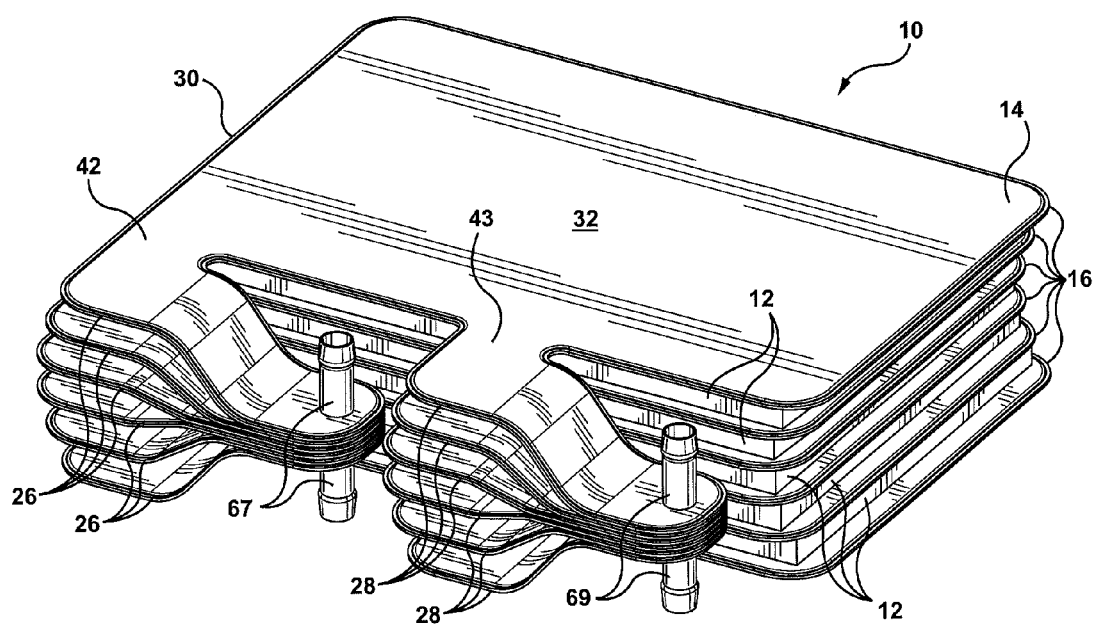
FIG. 1B is a front perspective view of a battery unit incorporating a variation of the heat exchanger of FIG. 1A.
Figure 1C:
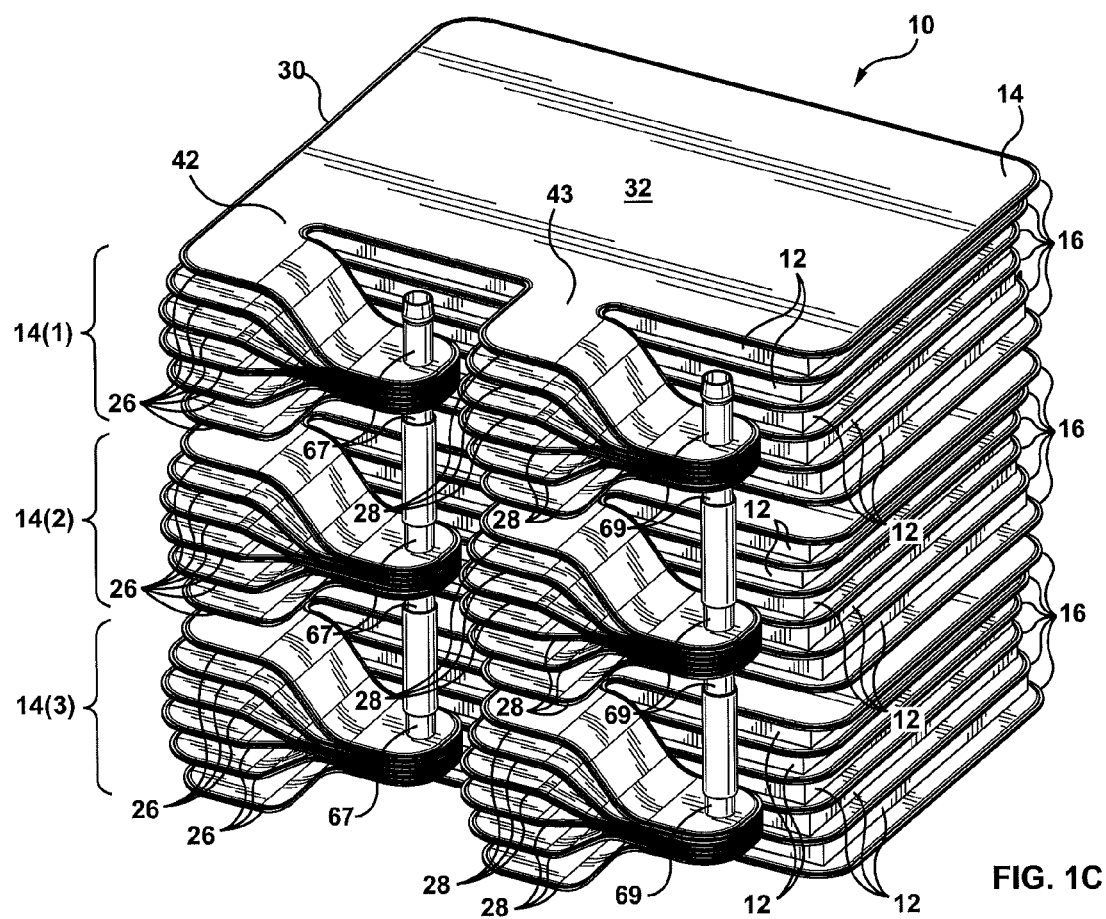
FIG. 1C is a front perspective view of a battery unit incorporating heat exchangers as shown in FIG. 1B.
Figure 2:
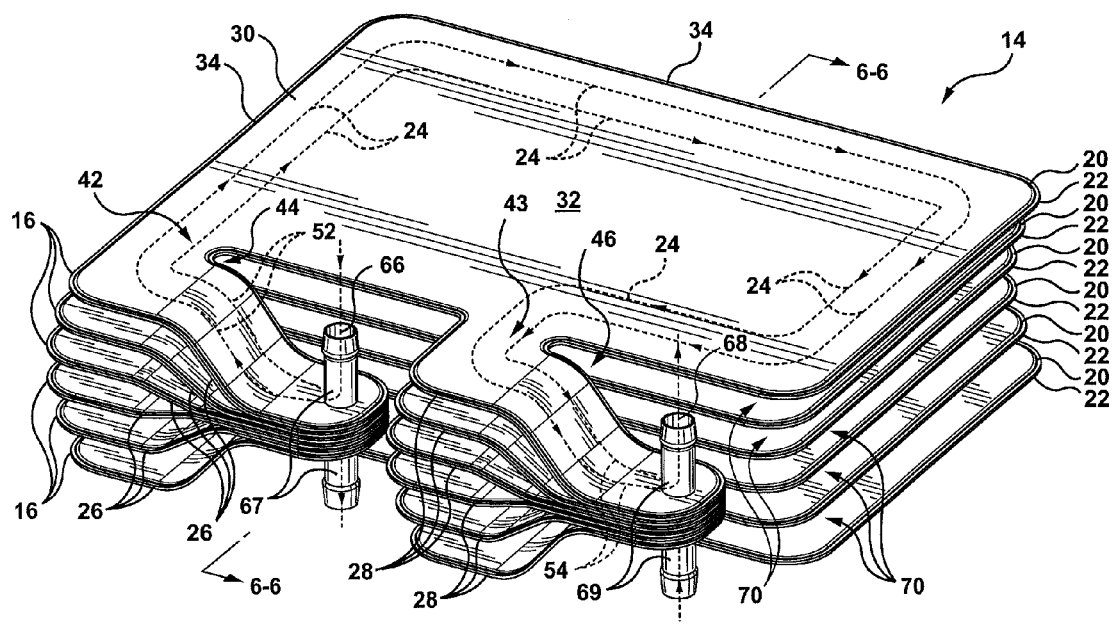
FIG. 2 is a front perspective view of the heat exchanger as shown in FIG. 1B with the battery cells removed.

Referring now to FIGS. 1 and 2 there is shown an illustrative example of a battery unit 10 incorporating a battery unit heat exchanger 14 according to an example embodiment of the present disclosure. The battery unit 10 is made up of a series of individual battery cell containers 12 that may each house one or more battery cells (not shown) and a battery unit heat exchanger 14. In the example embodiment, the battery unit heat exchanger 14 includes a plurality of substantially identical spaced apart sets of plate pairs or heat exchanger modules 16 that are arranged so as to be interleaved or sandwiched between adjacent battery cell containers 12 so that each battery cell container 12 is located between and in thermal contact with the opposing surfaces of two adjacent sets of spaced apart sets of plate pairs or heat exchanger modules 16.

Figure 4A:
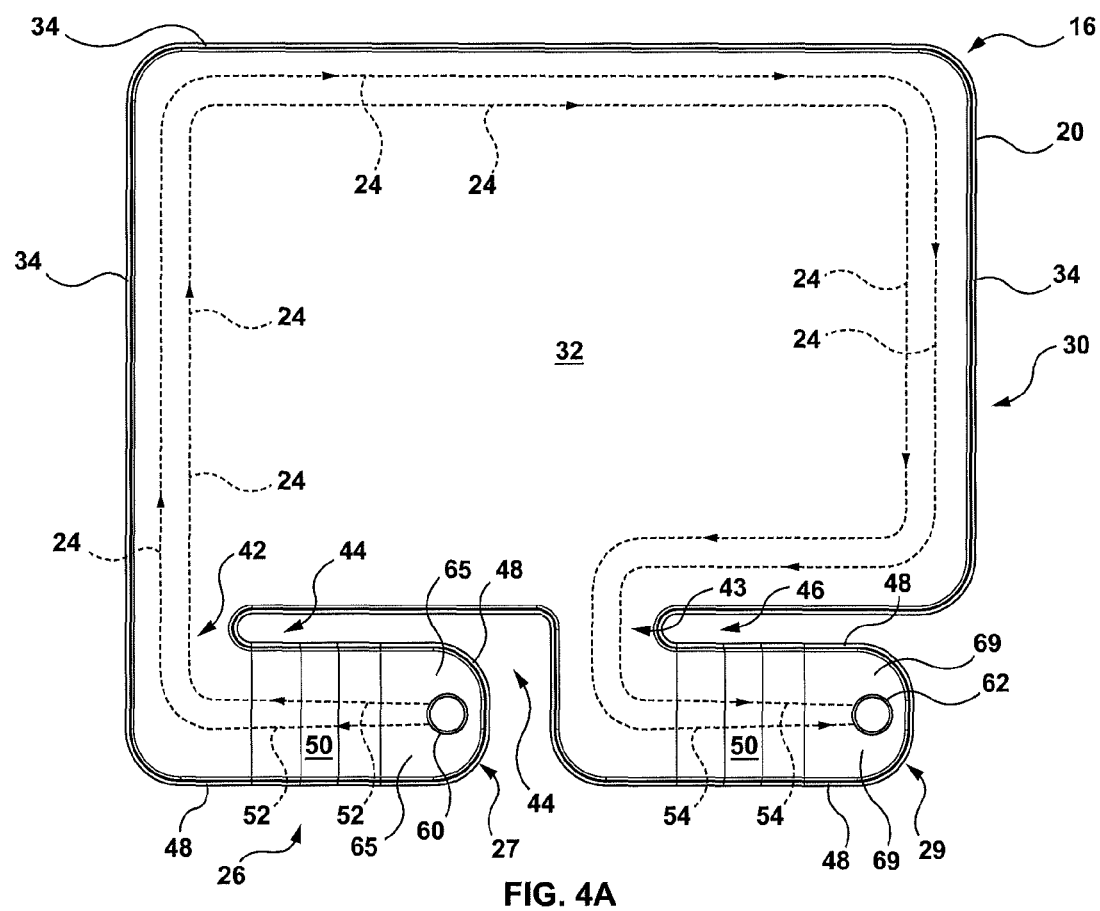
FIG. 4A is a top view of the first or uppermost heat exchanger module of the heat exchanger of FIG. 2 in its planar or unexpanded state.
Figure 4B:
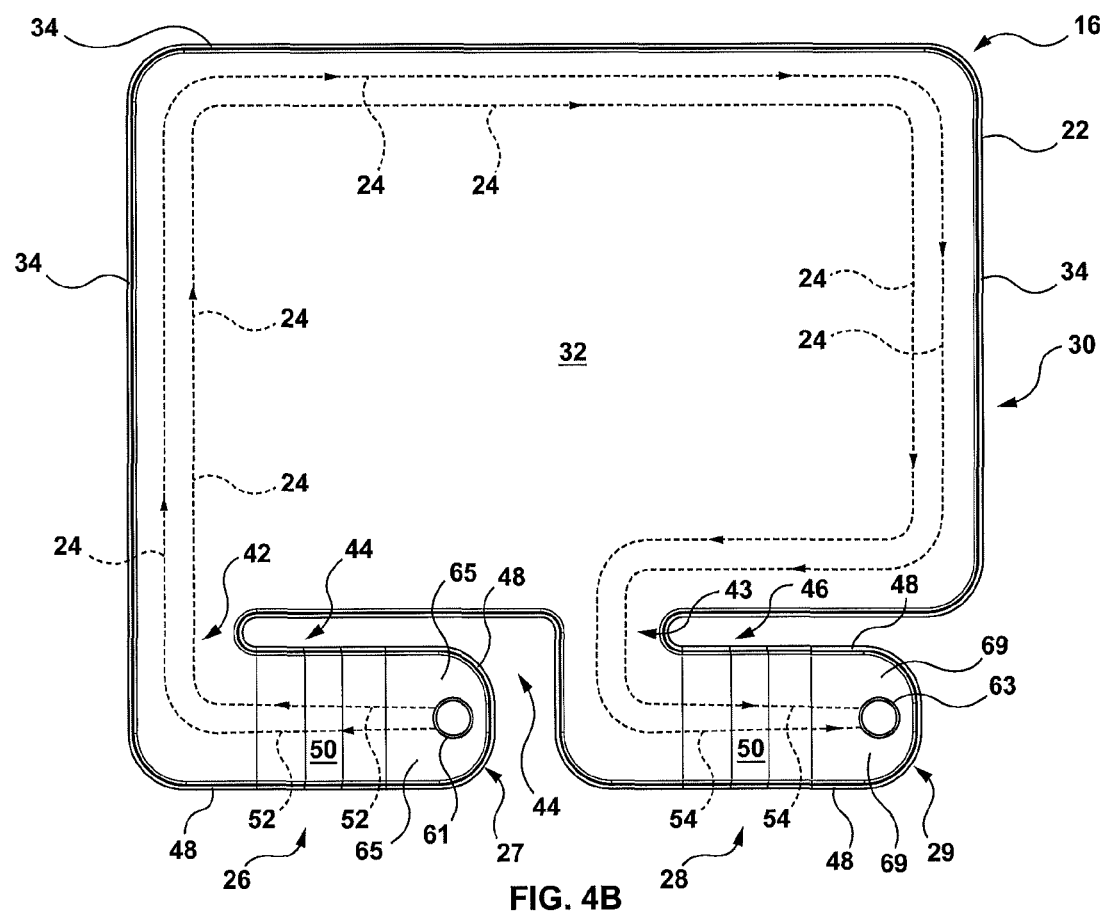
FIG. 4B is a bottom view of the heat exchanger module of FIG. 4A.

Each set of plate pairs or heat exchanger module 16 is formed by a pair of mating, complimentary first and second plates 20, 22. The first and second plates 20, 22 each include a central generally planar portion 32 surrounded by a peripheral flange 34. Inlet and outlet panels 26, 28 extend from the central generally planar portion 32 of each of the first and second plates 20, 22, the inlet and outlet panels 26, 28 also comprising a central portion 50 surrounded by a peripheral flange 48 as shown in FIG. 4. Accordingly, when the first and second plates 20, 22 are arranged in their face-to-face mating relationship, the central, generally planar portions 32 are spaced apart from each other thereby defining an internal flow passage 24 therebetween extending between the inlet panel 26 and the outlet panel 28. As well, an internal fluid inlet passage 52 is defined between the spaced apart central portions 50 of the inlet panels 26 and an internal fluid outlet passage 54 is defined between the spaced apart central portions 50 of the outlet panels 28 when said first and second plates 20, 22 are arranged in their face-to-face mating relationship, the first and second plates 20, 22 being sealed together by mating peripheral flanges 34, 48. Accordingly, each set of plate pairs or each heat exchanger module 16 includes a main generally planar section 30 providing a pair of opposed generally planar thermal contact surfaces for contacting a corresponding surface of the adjacent battery cell container 12, the main section 30 defining the internal flow passage 24 formed by the spaced apart central generally planar portions 32 of the first and second plates 20, 22 and with the inlet and outlet panels 26, 28 extending from the main section 30 thereof.

While FIGS. 1 and 2 schematically illustrate a heat exchanger 14 formed by six individual sets of plate pairs or heat exchanger modules 16 that are spaced apart from each other for receiving individual battery cell containers 12, it will be understood that the heat exchanger 14 can include fewer than six or more than six individual heat exchanger modules or sets of plate pairs 16 depending upon the particular application for the heat exchanger 14 and the total number of battery cell containers 12 included in the overall battery unit 10.

Figure 3:
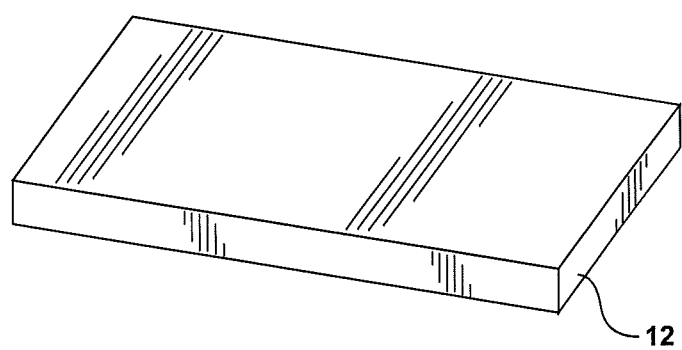
FIG. 3 is a perspective view of a battery cell container that forms part of the battery unit of FIGS. 1A-1C.

Referring now to FIG. 3, there is shown a schematic illustration of a battery cell container 12 that is arranged between the individual heat exchanger modules or sets of plate pairs 16 of heat exchanger 14 to form battery unit 10. In the illustrated embodiment, the heat exchanger modules 16 and the battery cell containers 12 have a generally rectangular footprint or profile, however, it will be understood that they could have other shapes in other example embodiments, for example square or circular, depending upon the particular application and/or requirements. Accordingly, it will be understood that the illustrated example embodiment is not intended to be limited to heat exchanger modules 16 and battery cell containers 12 having a generally rectangular footprint or profile.

Referring now to FIG. 4, there is shown a top view of one of the heat exchanger modules or sets of plate pairs 16 forming heat exchanger 14, in its unassembled, planar or unexpanded state as will be described in further detail below. As shown in the drawing, inlet and outlet panels 26, 28 extend substantially parallel to and spaced apart from an end of the central generally planar portion 32 of heat exchanger plates 20, 22 forming the heat exchanger module 16, the inlet and outlet panels 26, 28 being joined to the central generally planar portion 32 by respective joining portions 42, 43. Gaps 44, 46 separate the inlet and outlet panels 26, 28 from the main, central generally planar portion of the first and second plates 20, 22 with gap 44 also extending to separate the inlet panel 26 from the outlet panel 28. Accordingly, in the subject example embodiment, the inlet and outlet panels 26, 28 each extend between a respective free end 27, 29 and a respective fixed end corresponding to the respective joining portions 42, 43 of the inlet and outlet panels 26, 28. Since the inlet and outlet panels 26, 28 are significantly smaller and/or narrower as compared to the central, generally planar main portions 32 of the plates 20, 22, the inlet and outlet panels 26, 28 are more capable of flexing and/or bending under an external load than the central, generally planar portions 32 of the plates 20, 22. Accordingly, the inlet and outlet panels 26, 28 are generally considered to be somewhat compliant in the region extending between their free end 27, 29 and the corresponding joining portion 42, 43 as their structure allows them to flex independently of each other relative to the main, central generally planar portion 32 of the plates 20, 22 as shown for instance in FIGS. 1 and 2. Therefore, as a result of the arrangement of gaps 44, 46 separating the inlet and outlet panels 26, 28 from the central generally planar portion 32 of the plates 20, 22 and as a result of their overall structure as compared to the structure of the central, generally planar portion 32 of the plates 20, 22, the inlet and outlet panels 26, 28 can flex or be bent independently from the main, central generally planar portion 32 of the plates 20, 22. The inlet and outlet panels 26, 28 of each heat exchanger module 16 thereby define compliant regions extending between their respective free ends 27, 29 and respective joining portions 42, 43. The flexing and/or bending of the inlet and outlet panels 26, 28 of the respective heat exchanger modules 16 is described in further detail below. Furthermore, while the inlet and outlet panels 26, 28 are shown as being generally rectangular in shape, it will be understood that they could also have different shapes in different example embodiments depending on the particular requirements and/or application of the heat exchanger.

As described above, when the first and second heat exchanger plates 20, 22 are arranged in their face-to-face mating relationship to form plate pairs or heat exchanger modules 16, the peripheral flanges 34 surrounding the central generally planar portions 32 of the plates 20, 22 seal against each other and effectively space apart the central planar portions 32, which extend out of the plane of the corresponding peripheral flange 34, so as to form the internal flow passage 24 therebetween. Internal flow passage 24 is illustrated schematically in FIG. 4 by dashed flow lines 24 extending between the inlet and outlet panels 26, 28. Inlet and outlet panels 26, 28 are also formed with a peripheral edge 48 that surrounds a raised or depressed central portion 50 depending on whether you are considering the first (e.g. upper) or second (e.g. lower) heat exchanger plate 20, 22 such that when the first and second plates 20, 22 are arranged in their face-to-face mating relationship, the central portions 50 of the inlet and outlet panels 26, 28 are also spaced apart from each other with their edges being sealed together along their peripheral flange 48 forming the internal inlet fluid passage 52 and internal outlet fluid passage 54. The internal inlet and outlet fluid passages 52 are illustrated schematically in FIG. 4 by dashed flow lines 52 and 54.

Inlet panel 26 includes a pair of aligned fluid openings 60, 61, one formed in each of the first and second heat exchanger plates 20, 22 forming the heat exchanger module 16, the fluid openings 60, 61 being formed at the free end 27 thereof and in fluid communication with the internal inlet fluid passage 52. Similarly, the outlet panel 28 includes a pair of aligned fluid openings 62, 63, one formed in each of the first and second heat exchanger plates 20, 22 forming the heat exchanger module 16, the fluid openings 62, 63 being formed in the free end 27 thereof and in fluid communication with the internal outlet fluid passage 54. In the illustrated embodiment, the fluid opening 60 in the inlet panels serve as a fluid inlet opening for delivering an incoming common heat exchange fluid to said internal flow passage 24 in said main section 30 by way of the internal fluid inlet passage way 52 while fluid opening 61 serves to transmit the incoming common heat exchange fluid to the inlet panel 26 of the adjacent heat exchanger module 16. Similarly, fluid opening 62 in the outlet panels 28 serve as a fluid outlet opening for discharging the common heat exchange fluid exiting the internal flow passage 24 from one of the adjacent heat exchanger modules 16 by way of the internal outlet fluid passage 54 of the adjacent heat exchanger module 16 while fluid opening 63 provides fluid communication between the adjacent heat exchanger modules 16 for transmitting the common heat exchange fluid being discharged from one heat exchange module 16 to the subsequent heat exchanger module 16. Accordingly, in use, the common heat exchange fluid flowing through the individual heat exchange modules 16 enters the heat exchange module 16 through fluid inlet opening 60 in inlet panel 26, flows through internal inlet fluid passage 52 to internal flow passage 24 formed within the main generally planar section 30 of the module 16 in a plurality of generally C-shaped or somewhat inverted U-shaped internal flow paths as illustrated by dashed flow lines 24 before flowing through the internal outlet fluid passage 54 in outlet panel 28 and exiting the heat exchanger module 16 through fluid outlet opening 62. However, while a plurality of generally C-shaped or somewhat inverted U-shaped internal flow paths illustrated by dashed flow lines 24 have been shown, it will be understood that many different fluid flow path configurations through the internal flow passage 24 are possible and that the subject heat exchanger 14 is not intended to be limited to generally C-shaped or somewhat inverted U-shaped internal flow paths 24 shown schematically in FIG. 4.

In heat exchanger 14, the plurality of individual heat exchanger modules 16 are fluidly interconnected by way of their inlet panels 26 and outlet panels 28. More specifically, when the individual sets of plate pairs or heat exchanger modules 16 are arranged in a stack to form heat exchanger 14, the inlet panels 26 of adjacent heat exchanger modules 16 are aligned and interconnected at their free ends 27 such that the fluid opening 61 formed in the second plate 22 that forms the inlet panel 26 of one heat exchanger module 16 is aligned and in fluid communication with the fluid opening 60 formed in the first plate 20 of the adjacent heat exchanger module 16 in order to transmit or deliver a portion of the incoming common heat exchange fluid to the adjacent heat exchanger module 16 forming part of heat exchanger 14. Similarly, the outlet panels 28 of adjacent heat exchanger modules 16 are aligned and interconnected at their free ends 29 such that the fluid opening 62 formed in the first plate 20 that forms the outlet panel 28 of one heat exchanger module 16 is aligned and in fluid communication with the fluid opening 63 formed in the second plate 22 of the adjacent heat exchanger module 16. Accordingly, the aligned fluid openings 60, 61 of the aligned inlet panels 26 and the aligned fluid openings 62, 63 of the aligned outlet panels 28 form respective inlet and outlet manifolds 66, 68 of heat exchanger 14. Inlet and outlet fittings 67, 69 are arranged at one end of the heat exchanger 14 (as shown in FIG. 1A), or both (as shown in FIGS. 1B & 1C), depending upon the specific fluid flow arrangement through the heat exchanger 14. The inlet and outlet fittings 67, 69 are arranged in fluid communication with the inlet and outlet manifolds 66, 68 for inletting and discharging the heat exchange fluid (e.g. any suitable coolant for cooling battery cell containers 12 of battery unit 10) to and from the heat exchanger 14. In FIG. 1A, the inlet and outlet fittings are shown arranged at the top or upper end of the heat exchanger 14, however, it will be understood that they could also be arranged at the opposite, bottom or lower end of the heat exchanger 14. In some embodiments, inlet and outlet fittings 67, 69 can be arranged at both the upper and lower ends of the heat exchanger 14 as shown for instance in FIG. 1B. By having inlet and outlet fittings 67, 69 arranged at both ends of the heat exchanger 14, multiple groups of heat exchangers 14 (e.g. heat exchangers 14(1), 14(2), 14(3) can be strung together or fluidly interconnected by the various pairs of inlet and outlet fittings 67, 69 as shown for instance in FIG. 1C. As illustrated, the second set of inlet and outlet fittings 67, 69 arranged at the bottom or lower end of the first heat exchanger 14(1) serve to interconnect the first group of heat exchanger modules 16 or first heat exchanger 14(1) or to a second group of heat exchanger modules 16 or second heat exchanger 14(2). Similarly, the second set of inlet and outlet fittings 67, 69 arranged at the bottom or lower end of the second heat exchanger 14(2) serve to interconnect the second heat exchanger 14(2) to a third group of heat exchanger modules 16 or third heat exchanger 14(3). By interconnecting various groups of heat exchanger modules 16 or various heat exchangers 14(1), 14(2), 14(3) together, the overall heat exchanger 14 can be adjusted to accommodate any number of battery cell containers 12. The inlet and outlet fittings 67, 69 that interconnect the various groups of heat exchanger modules 16 While FIGS. 1B, 1C, 2, 5 and 6 show the inlet and outlet fittings 67, 69 as being arranged at both the top (or upper end) and bottom (or lower end) of the heat exchanger 14 it will be understood that, depending upon the particular application for the heat exchanger 14, the inlet and outlet fittings 67, 69 could also be arranged at only the top (or upper end) as shown in FIG. 1A or at only the bottom (or lower end) of the heat exchanger 14.

In order to form heat exchanger 14, a plurality alternating first and second plates 20, 22, in their planar state, are arranged in a stack in their face-to-face mating relationship. The stack of the plurality of face-to-face mating first and second plates 20, 22 therefore forming the individual heat exchanger modules 16, the individual heat exchanger modules 16 therefore being stacked one on top of the other. First and second plates 20, 22 are generally made from material that is braze clad on only one side, e.g. the interior surfaces of plates 20, 22 that are intended to seal together. Therefore, when the stack of alternating first and second plates 20, 22 is brazed together, only the interior surfaces or mating faces, e.g. mating peripheral flanges 34, 48 of first and second plates 20, 22 are brazed or fixed together thereby forming the individual heat exchanger modules 16, while the outer surfaces of the individual heat exchanger modules 16 remain un-bonded to each other in the stack. In order to connect the individual heat exchanger modules 16 together, the localized areas surrounding the fluid openings 60, 61 formed in the free ends 27 on the outer surfaces of the inlet panels 26 and the localized areas surrounding the fluid openings 62, 63 formed in the free ends 29 of the outer surfaces of the outlet panels 28 may be formed and/or coated with braze clad material or, alternatively, a brazing shim (not shown) may be arranged between the adjacent inlet panels 26 and outlet panels 28 to ensure that the inlet and outlet panels 26, 28 of adjacent heat exchanger modules 16 are interconnected when the stack of alternating first and second plates 20, 22 are brazed together to form inlet and outlet manifolds 66, 68. Accordingly, the localized areas surrounding the fluid openings 60, 61 on the outer surfaces of the inlet panels 26 and the localized areas surrounding the fluid openings 62, 63 on the outer surfaces of the outlet panels 28 define inlet manifold contact regions 65 and outlet manifold contact regions 69. In some example embodiments, the inlet manifold contact regions 65 and outlet manifold contact regions 69 may be in the form of bosses that extend slightly out of the plane of the central portion 50 of the inlet and outlet panels 26, 28 or may be areas that are co-planar with the central portion of the inlet and outlet panels 26, 28.

Once the stack of alternating first and second plates 20, 22 is brazed together forming individual heat exchanger modules 16, the plurality of individual heat exchanger modules 16 that are now stacked one on top of the other are only interconnected at the respective free ends 27, 29 of the aligned inlet and outlet panels 26, 28 of the individual modules 16. Since the inlet and outlet panels 26, 28 include compliant regions extending between the interconnected free ends 27, 29 of the inlet and outlet panels 26, 28 and their respective joining portions 42, 43, the individual heat exchanger modules 16 can be spaced apart from each other, post-brazing, in order to form gaps 70 therebetween for receiving the individual battery cell containers 12. More specifically, as a result of the arrangement of gaps 44, 46 separating the inlet and outlet panels 26, 28 from the main section 32 of the plates 20, 22 and due to the tendency of the inlet and outlet panels 26, 28 to flex or bend under an external load as a result of their structure as compared to the main, central portion 30 of the heat exchanger modules 16, the inlet and outlet panels 26, 28 can be bent, curved or flexed with respect the fixed interconnected ends 27, 29 of the inlet and outlet panels 27, 29 thereby allowing the individual heat exchanger modules 16 to be spaced or spread apart from one another forming gaps 70 between the main generally planar sections 30 of the adjacent heat exchanger modules 16. Accordingly, in the subject embodiment, the stack of individual heat exchanger modules 16 are fanned-out or expanded with respect to each other post-brazing, the inlet and outlet panels 26, 28 therefore having a first assembly position wherein the inlet and outlet panels 26, 28 lie generally in the same plane as the main generally planar section 30 of the heat exchanger modules 16 and a second operable position wherein the inlet and outlet panels 26, 28 extend out of the plane of the main generally planar section 30 of the heat exchanger modules 16.

Figure 5:
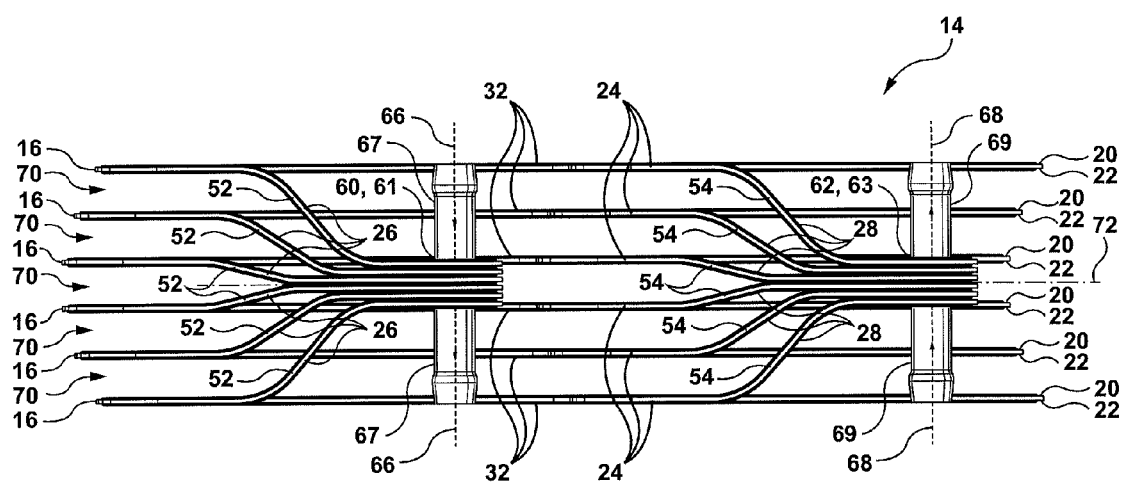
FIG. 5 is a front elevation view of the heat exchanger of FIG. 2, with the battery cell containers removed.
Figure 6:
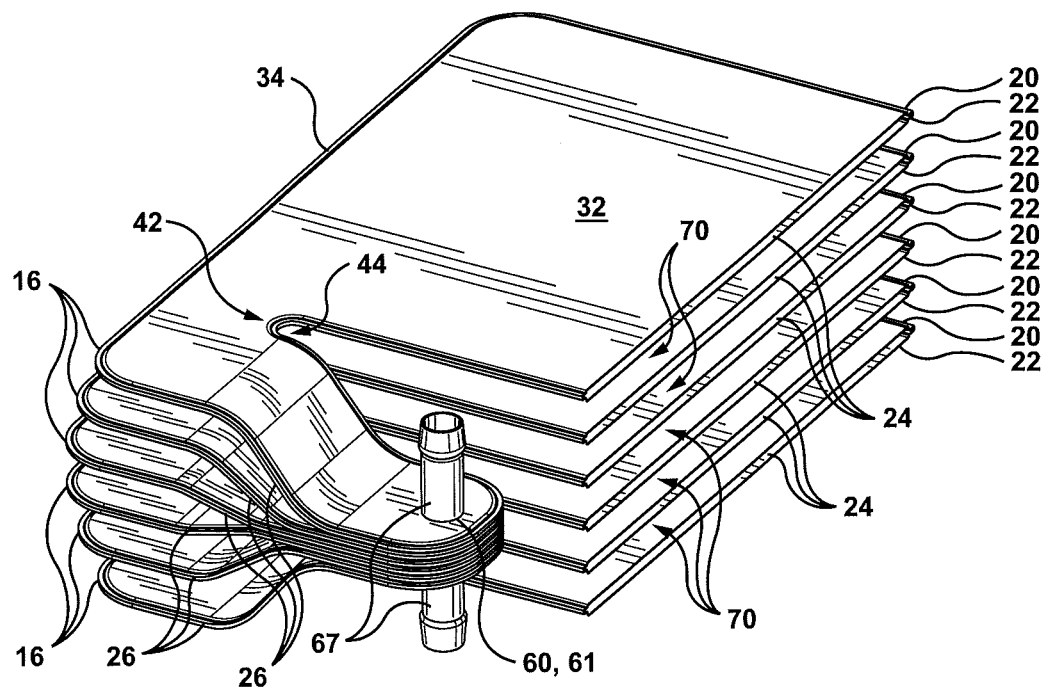
FIG. 6 is a perspective, cross-sectional view of the heat exchanger of FIG. 2 taken along section line 6-6 shown in FIG. 2.

Accordingly, the inlet and outlet panels 26, 28 can be bent upwards or downwards with respect to their interconnected free ends 27, 29 (or inlet and outlet manifold regions 66, 68) in order to raise or lower the main section 30 of the heat exchanger modules 16 with respect to a mid-line 72 of the heat exchanger 14 as shown for instance in FIG. 5 while the main sections 30 and joining portions 42, 43 of the individual heat exchanger modules 16 remain generally planar with the main section 30 and joining portions 42, 43 of each module 16 lying generally in the same plane as each other and parallel to the midline 72 of the heat exchanger so as to provide an adequate generally planar contact surface over the main section 30 of the heat exchanger modules 16 for contacting the corresponding generally planar surface of the individual battery cell containers 12.

Since the individual heat exchanger modules 16 forming heat exchanger 14 are only spaced apart from each other post-brazing, manufacturing and/or assembly of the heat exchanger 14 is somewhat facilitated since relatively easy-to-manufacture, stamped or rolled, generally planar first and second plates 20, 22 can be used and arranged in an alternating stack without requiring the placement of spacers therebetween and/or more complex boss or manifold structures formed as part of the plates 20, 22 in order to interconnect and space apart the various sets of plate pairs or heat exchanger modules 16 to form heat exchanger 14. Instead, the stack of generally planar first and second plates 20, 22 can be brazed together (using brazing shims, localized braze-clad areas, or any other suitable means) to form an interconnected stack of heat exchanger modules 16, the stack of heat exchanger modules 16 then being expanded, post-brazing, in order to provide adequate spacing between the heat exchanger modules 16 to accommodate battery cell containers 12 therebetween.

Since the stack of interconnected heat exchanger modules 16 is expanded post-brazing as a result of the compliant regions of the inlet and outlet panels 26, 28, the heat exchanger modules 16 can be spaced apart from each other as much or as little as is necessary, within an allowable range, based on the structure of the first and second plates 20, 22, in particular the size of the plates and the size, length of the inlet and outlet panels 26, 28, as well as based on the total number of first and second plates 20, 22 in the stack, to accommodate the specific size of the battery cell containers 12 used to form battery unit 10. Accordingly, the same heat exchanger first and second plates 20, 22 can be used to form a variety of heat exchangers 14 that can be specifically adapted to accommodate different sizes of battery cell containers 12.

Referring now to FIGS. 7-11 there is shown another exemplary embodiment of a heat exchanger 114 according to the present disclosure. Similar reference numerals, increased by a factor of 100 have been used to identify similar components and/or features.

Figure 7:
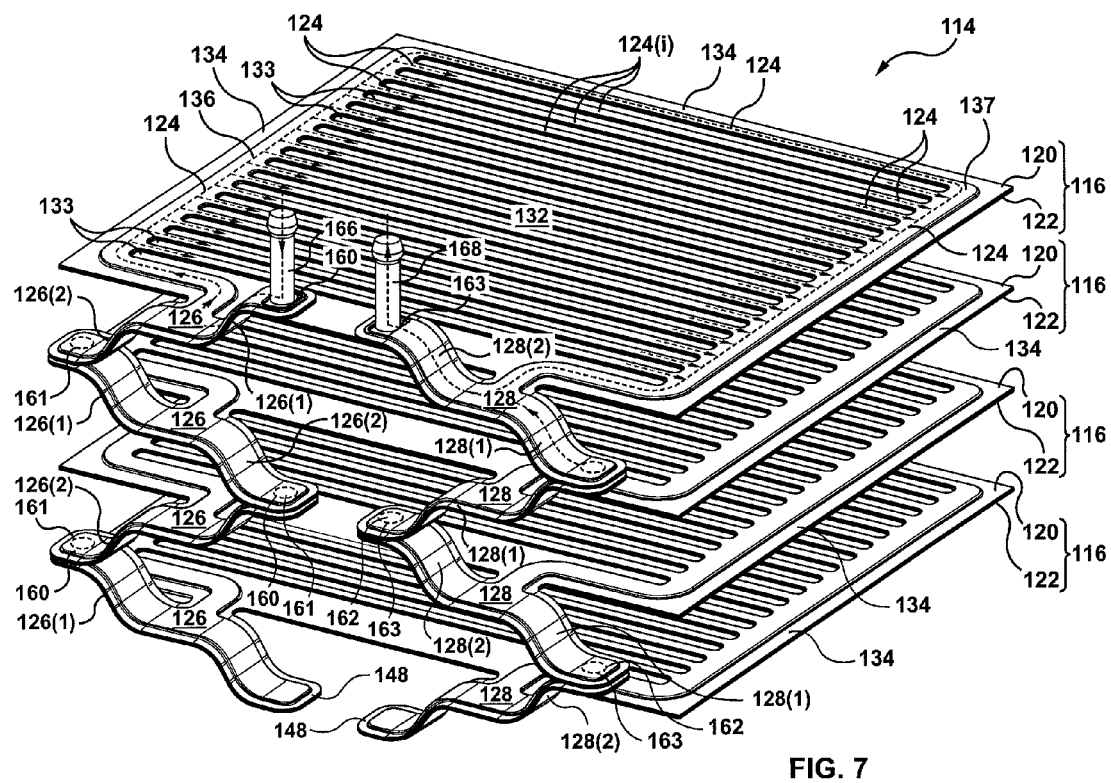
FIG. 7 is a perspective view of a heat exchanger according to another example embodiment of the present disclosure.

FIG. 7 schematically illustrates a heat exchanger 114 made up of four sets of spaced apart plate pairs or heat exchanger modules 116. However, while only sets of plate pairs or heat exchanger modules 116 have been illustrated in the drawings it will be understood that heat exchanger 114 can include more (or less) than the four sets of plate pairs or heat exchanger modules 116 shown, depending upon the total number of battery cell containers 112 in the overall battery unit 10.

As in the previously described embodiment, each set of plate pairs or each heat exchanger module 116 is formed by a pair of mating complimentary first and second plates 120, 122. The first and second plates 120, 122 are generally identical in structure, with each plate 120, 122 having a central generally planar portion 132 surrounded by a peripheral flange 134, the central generally planar portion 132 extending out of the plane of the peripheral flange 134 so that when the plates 120, 122 are arranged in their mating face-to-face relationship. Inlet and outlet panels 126, 128 extend from the central generally planar portion 132 of each of the first and second plates 120, 122, the inlet and outlet panels 126, 128 also comprising a central portion 150 surrounded by a peripheral flange 148. When the first and second plates 120, 122 are arranged in their face-to-face mating relationship, the central generally planar portions 132 are spaced apart from each other so as to define an internal flow passage 124 therebetween. As well, an internal fluid inlet passage 152 is defined between the spaced apart central portions 50 of the inlet panels 126 and an internal fluid outlet passage 54 is defined between the spaced apart central portions 150 of the outlet panels 128 when said first and second plates 120, 122 are arranged in their face-to-face mating relationship, the first and second plates 120, 122 being sealed together by their mating peripheral flanges 134, 148. Accordingly, each set of plate pairs or heat exchanger modules 116 includes a main generally planar section 130 defining internal flow passage 124 formed by the spaced apart central generally planar portions 132 of the first and second plates 120, 122 and respective inlet and outlet panels 126, 128 that extend from the main section 130 thereof.

In the subject example embodiment, the central, generally planar portions 132 of each of the first and second plates 120, 122 may be formed with a plurality of grooves or inwardly disposed ribs 133 that mate or come into contact with the corresponding ribs 133 formed on the corresponding mating plate 120, 122 so as to divide the internal flow passage 24 into a plurality of individual flow passages identified schematically as individual flow passages 124(i), the plurality of individual flow passages 124(i) being interconnected by respective inlet and outlet manifold regions 135, 137 formed at opposed edges of the central generally planar portion 132 of the plates 120,122. Accordingly, in use, fluid flowing through each of the heat exchange modules 116 flows through the plurality of generally parallel fluid flow passages 124(i) from the inlet panel 126 to the outlet panel 128 as illustrated schematically by dashed flow lines 124 in FIG. 7. However, it will be understood that many different fluid flow path configurations are possible and that the subject heat exchanger 114 is not intended to be limited to a plurality of generally parallel fluid flow passages 124(i) formed by mating inwardly disposed ribs 133 as illustrated schematically in FIGS. 7, 9, 10 and 11.

Figure 10:
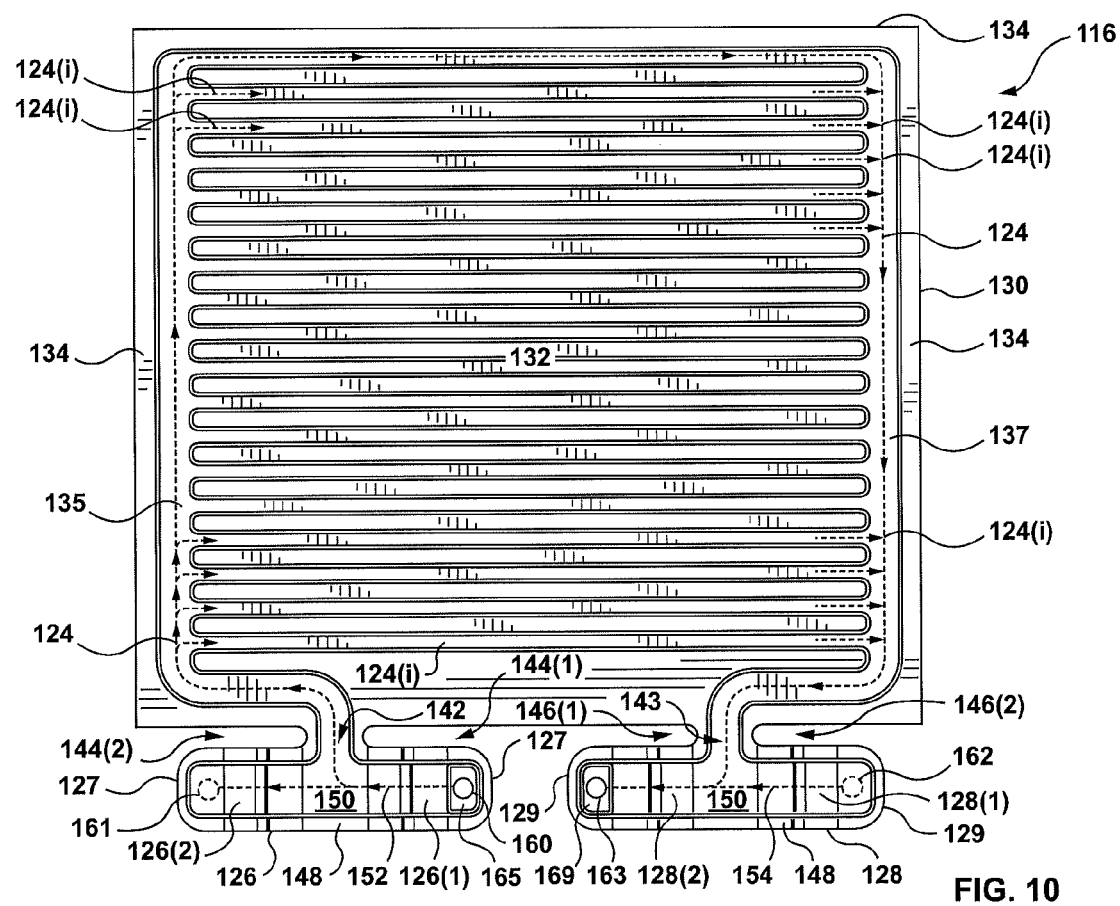
FIG. 10 is a top plan view of the first or uppermost heat exchanger module of the heat exchanger of FIG. 7 in its planar or unexpanded state.

Referring now to FIG. 10, there is shown a top view of the uppermost heat exchanger module 116 of heat exchanger 114 as shown in FIG. 7, in its unassembled or unexpanded state as will be described in further detail below. As shown in FIG. 10, inlet and outlet panels 126, 128 extend substantially parallel to and spaced apart from an end of the central generally planar portions 132 of the first and second plates 120, 122, the inlet and outlet panels 126, 128 being joined to the main plate section 130 by respective joining portions 142, 143. In the subject example embodiment, the joining portions 142, 143 form a T-joint with the respective inlet and outlet panels 126, 128 that interconnect the inlet and outlet panels 126, 128 to the central generally planar portions 132 of the plates 120, 122. Accordingly, in the subject embodiment the inlet and outlet panels 126, 128 each have respective first and second branches 126(1), 126(2), 128(1), 128(2) that extend in opposite directions to each other on either side of their respective joining portions 142, 143. Gaps 144(1), 144(2) separate the first and second branches 126(1), 126(2) from the central generally planar portions 132 of the plates 120, 122, while gaps 146(1) and 146(2) separate the first and second branches 128(1), 128(2) of the outlet panels 128 from the central generally planar portions 132 of the plates 120, 122. Accordingly, in the subject example embodiment, the inlet and outlet panels 126,128 extend between a respective pair of free ends 127, 129 and are interconnected to the central generally planar portions 132 of the plates 120, 122 by joining portions 142, 143 located in between the respective pairs of free ends 127, 129 that define the inlet and outlet panels 126, 128.

Figure 8:
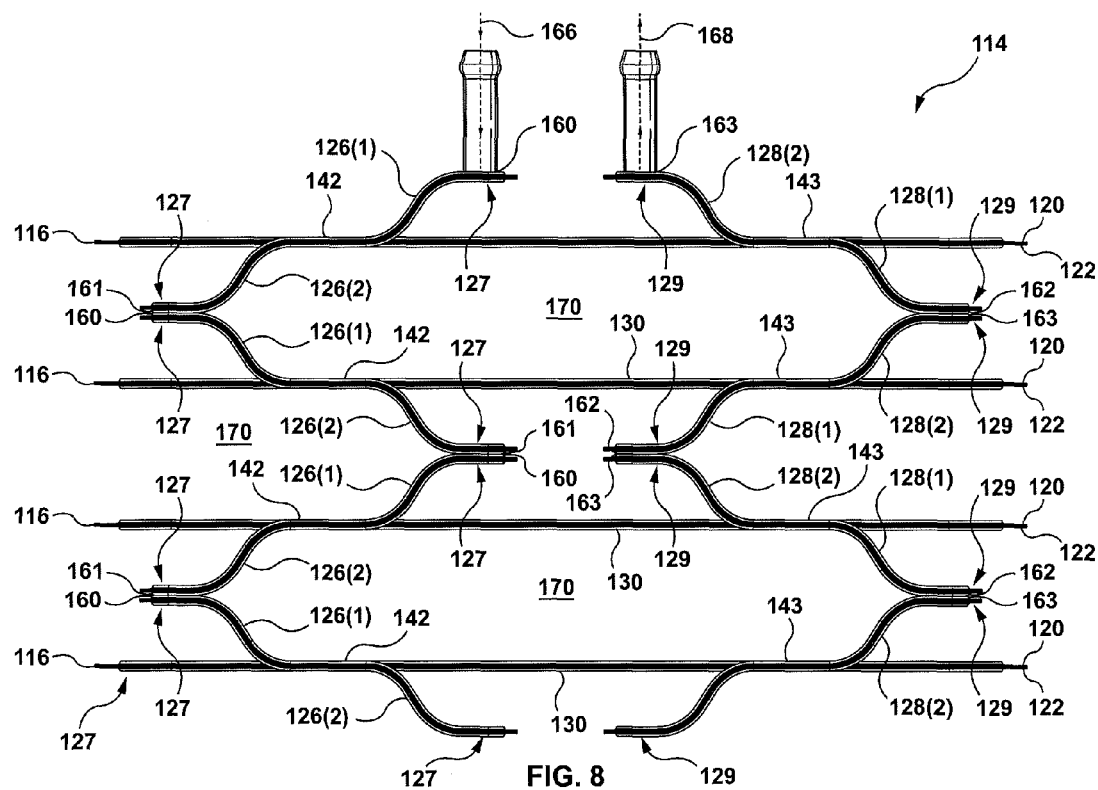
FIG. 8 is a front elevation view of the heat exchanger of FIG. 7.
Figure 9:
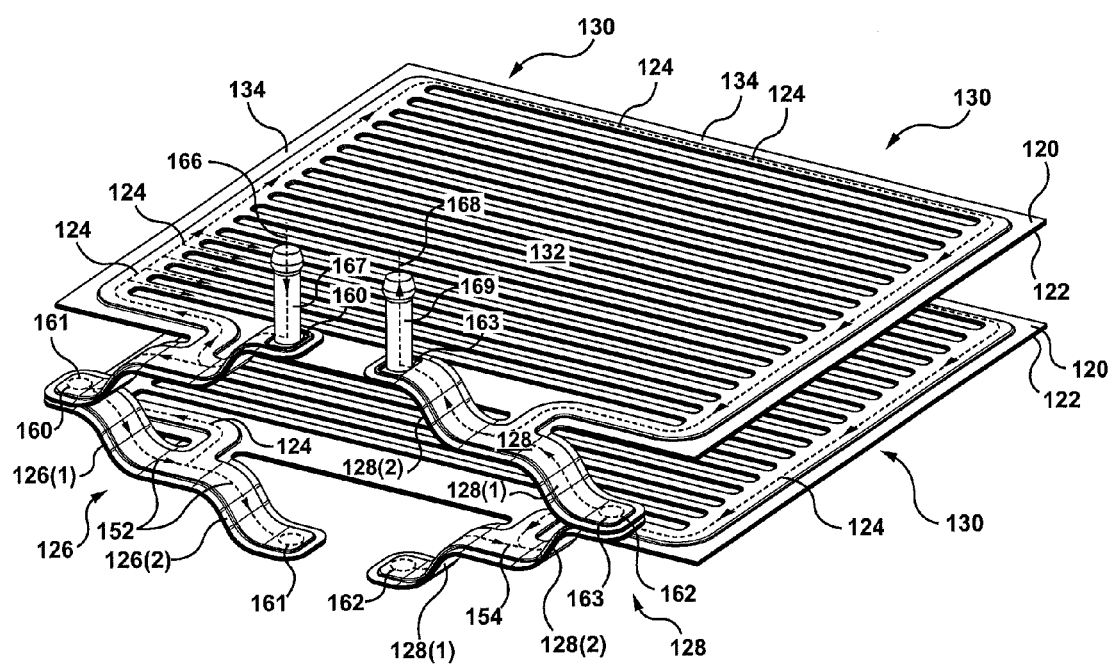
FIG. 9 is a perspective view of two of the heat exchanger modules that form part of the heat exchanger of FIG. 7.

As in the previously described embodiment, while the first and second heat exchanger plates 120, 122 are formed so as to have a generally rigid structure across the central generally planar portions 132 and joining portions 142, 143 of the plates 120, 122, the inlet and outlet panels 126, 128 are formed so as to be generally compliant in nature in the regions extending between their free ends 127, 129 and the corresponding joining portions 142, 143 so that each of the first and second branches 126(1), 126(2), 128(1), 128(2) of the inlet and outlet panels 126, 128 can flex independently of each other relative to the corresponding joining portions 142, 143 and the central generally planar portions 132 of the plates 120, 122, as shown for instance in FIG. 8. As a result of the arrangement of gaps 144, 146 separating the inlet and outlet panels 126, 128 from the central generally planar portion 132 of the plates 120, 122 and the tendency of the inlet and outlet panels 126, 128 to flex or bend independently of each other with respect to the main portions 30 of the plates due to their comparatively smaller size/width, the main central generally planar portions 132 of the individual modules 116 can be spaced apart from each other, post-brazing, to accommodate the placement of the battery cell containers 12 therebetween. The first and second branches 126(1), 126(2), 128(1), 128(2) of the inlet and outlet panels 126, 128 of each heat exchanger module 116 therefore define generally compliant regions extending between their respective free ends 127, 129 and the corresponding joining portions 142, 143. The flexing and/or bending of the first and second branches 126(1), 126(2), 128(1), 128(2) of the inlet and outlet panels 126, 128 of the respective heat exchanger modules 116 is described in further detail below.

In the example embodiment, the inlet panel 126 of each heat exchanger module 116 includes a pair of fluid openings 160, 161, one being formed in each of the opposed free ends 127 of the inlet panel 126 on either side thereof, each of the fluid openings 160, 161 being in fluid communication with the internal inlet fluid passage 152 of the inlet panel 126. Similarly, the outlet panel 128 includes a pair of fluid openings 162, 163, one being formed in each of the opposed free ends 129 of the outlet panel 128 on either side thereof, each of the fluid openings 162, 163 being in fluid communication with the internal outlet fluid passage 154 of the outlet panel 128. In the illustrated embodiment, fluid opening 160 serves as a fluid inlet opening and is formed in the first branch 126(1) of the first or upper heat exchange plate 120 that forms part of the heat exchanger module 116 for delivering the common heat exchange fluid to the internal flow passages 124(i) by way of the internal inlet fluid passage 152. Fluid opening 161 serves as a fluid outlet opening and is formed in the second branch 126(2) of the inlet panel 126 formed by the second or lower heat exchange plate 122 for transmitting the incoming heat exchange fluid to the inlet panel 126 of the adjacent heat exchanger module 116. In the outlet panels 128, fluid opening 162 serves as a fluid inlet opening and is formed in the first branch 128(1) of the second, or lower heat exchange plate 122 that forms the heat exchange module 116 for receiving the common heat exchange fluid exiting the internal flow passages 124(i) from one of the adjacent heat exchanger modules 116 by way of the internal outlet fluid passage 154 of the adjacent heat exchanger module 116 while fluid opening 163 formed in the second branch 128(2) of the first or upper heat exchanger plate 120 serves as a fluid outlet opening for discharging the common heat exchanger fluid from the heat exchanger module 116 to the subsequent heat exchanger module 116. Accordingly, in use, the common heat exchange fluid flowing through the individual heat exchanger modules 116 enters the heat exchanger module 116 through fluid inlet opening 160 formed in the inlet panel 126 of the first heat exchange module 116, and flows through the portion of the internal inlet fluid passage 152 formed in the first branch 126(1) of the inlet panel 126 to the inlet manifold region 135 where it is distributed to and flows through the plurality of internal flow passages 124(i) to outlet manifold region 137 formed within the main generally planar section 130 of the module 116 as illustrated by dashed flow lines 124 before flowing through the portion of the internal outlet fluid passage 154 formed in the second branch 128(2) of the outlet panel 128 before exiting the heat exchanger module 116 through fluid outlet opening 163. Accordingly, it will be understood that in the subject example embodiment that the first branch 126(1) of the inlet panel 126 interconnects the fluid inlet opening 160 and the corresponding joining portion 142 while the second branch 126(2) of the inlet panel 126 interconnects the joining portion 142 and the fluid outlet opening 161. Similarly, the first branch 128(1) of the outlet panel 128 interconnects the fluid inlet opening 162 and the joining portion 143 while the second branch 128(2) interconnects the joining portion 143 and the outlet opening 163.

Figure 11:
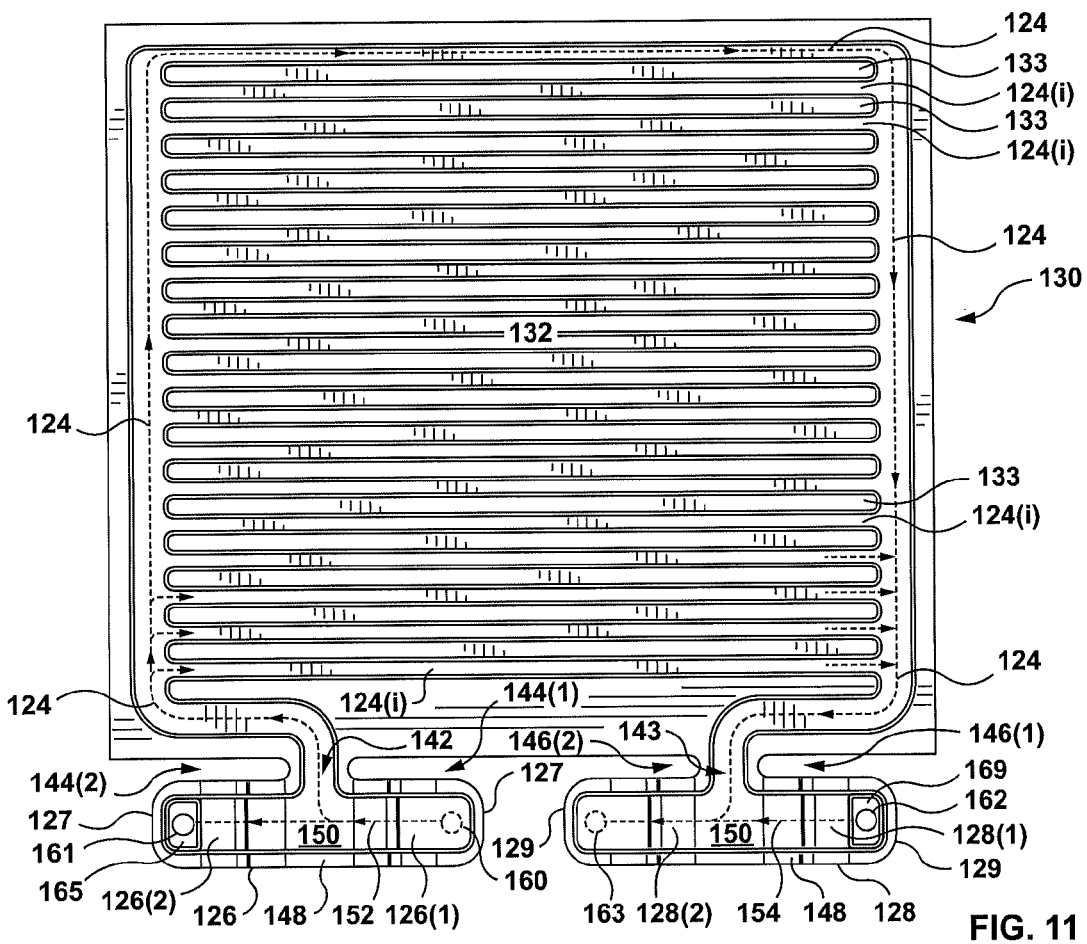
FIG. 11 is a bottom plan view of the heat exchanger module of FIG. 10.

In order for the common heat exchange fluid to flow from the first heat exchange module 116 to the adjacent heat exchange module 116 in the stack of heat exchanger modules 116 forming heat exchanger 114, the plurality of individual heat exchanger modules 116 are fluidly interconnected by way of their aligned inlet panels 126 and outlet panels 128. More specifically, the first and second branches 126(1), 126(2) of the inlet panel 126 and the first and second branches 128(1), 128(2) of the outlet panel 128 of adjacent heat exchanger modules 116 are reversed or arranged opposite to the first and second branches 126(1), 126(2) of the inlet panel 126 and the first and second branches 128(1), 128(2) of the preceding heat exchanger module 116 in order to alternate the location of the inlet and outlet openings 160, 161, 162, 163 in the inlet and outlet panels 126, 128 of adjacent heat exchanger modules 116. More specifically, as shown in FIGS. 10 and 11, in the case of the uppermost heat exchanger module 116, the fluid inlet opening 160 is formed in the innermost free end 127 of the inlet panel 126 of the first plate 120 of the heat exchanger modules while the outlet opening 161 is formed in the outermost end of the inlet panel 126 of the corresponding second plate 122. Similarly, the inlet opening 162 is formed in the outermost end of the outlet panel 128 of the second plate 122 of the heat exchanger modules 116 while fluid outlet opening 163 is formed in the innermost end of the outlet panel 128 of the corresponding first plate 120. In the adjacent heat exchanger module 116, the location of the inlet and outlet openings 160, 161 in the inlet panel 126 are reversed with the inlet opening 160 being formed in the outermost end of the inlet panel 126 of the first plate 120 of the adjacent heat exchanger modules and with the outlet opening 161 being formed in the innermost end of the inlet panel 126 of the corresponding second plate 122. Similarly, the locations of the inlet and outlet openings 162, 163 of the outlet panel 128 are reversed in adjacent heat exchanger modules 116 with the inlet opening 162 being formed in the innermost end of the outlet panel 128 of the second plate 122 of the adjacent heat exchanger module 116 and with the outlet opening 163 being formed in the outermost end of the outlet panel 128 of the corresponding first plate 120. Therefore, in the subject embodiment, the internal fluid inlet passage 152 of each of the heat exchanger modules 116 provides fluid communication between the fluid inlet opening 160 and the internal flow passage 124 formed by the central generally planar portions 132 of the plates 120, 122 and also interconnects the fluid inlet opening 160 and the fluid outlet opening 161 of the inlet panel 126 in order to transmit the incoming common heat exchange fluid from one heat exchanger module 116 inlet panel 126 to the adjacent heat exchanger module 116 inlet panel 126 via the fluid outlet opening 161. Similarly, the internal fluid outlet passage 154 formed in the outlet panels 128 of the individual heat exchanger modules 116 provides fluid communication between the internal flow passage 124 formed by the central generally planar portions 132 of the plates 120, 122 and the fluid outlet 163 of the outlet panel 128 and also interconnects the fluid inlet opening 162 and the fluid outlet opening 163 in order to transmit the heat exchanger fluid that is being discharged from one heat exchanger module 116 to the adjacent heat exchanger module 116.

The alternating arrangement of the fluid inlet and outlet openings 160, 161 of the inlet panels 126 and the fluid inlet and outlet openings 162, 163 of the outlet panels 128 of the heat exchanger modules 116 continues through the stack of heat exchanger modules 116 forming the heat exchanger 114 until the last or bottommost heat exchanger module 116 in the stack wherein the inlet panel 126 only includes a fluid inlet 160 and the outlet panel 128 only includes a fluid outlet 163. Accordingly, in the last or bottommost heat exchanger module 116 in the stack, the second branch 126(2) of the inlet panel 126 and the first branch of the outlet panel 128(1) of the last or bottommost heat exchanger module 116 both terminate at respective closed ends with no openings formed therein.

In order to form heat exchanger 114, a plurality of pairs of alternating first and second plates 120, 122, in their planar state, are arranged in their face-to-face mating relationship, the stack of alternating first and second plates 120, 122 therefore forming a stack of alternating, planar individual heat exchanger modules 116. The stack of plates 120, 122 forming the individual heat exchanger modules 116 are arranged so that all of the inlet panels 126 and outlet panels 128 are stacked one on top of the other so that the outlet opening 161 of the inlet panel 126 of one heat exchanger module 116 is aligned with the inlet opening 160 of the adjacent of heat exchanger module 116 in the stack of heat exchanger modules 116, and so forth to form a common fluid inlet manifold 166. Similarly, all of the outlet panels 128 are arranged so that the outlet opening 163 of the outlet panel 128 of one heat exchanger module 116 is aligned with the inlet opening 162 of the outlet panel 128 of the adjacent heat exchanger module 116 and so forth in order to form a common fluid outlet manifold 168.

As in the previously described embodiment, the first and second plates 120, 122 of each heat exchanger module 116 are generally made from material that is braze clad on only one side, e.g. the interior, mating surfaces of the plates 120, 122. Therefore, when the stack of plates 120, 122 forming heat exchanger modules 116 is brazed together, only the interior surfaces or mating faces of plates 120, 122 are brazed together forming the internal fluid passages 124 while the outer surfaces of the individual heat exchanger modules 116 remain generally un-bonded to each other. In order to connect the individual heat exchanger modules 116 together, the localized areas surrounding the fluid openings 160, 161 formed in the opposed free ends 127 of the inlet panels 126 on the outer surfaces thereof and the localized areas surrounding the fluid openings 162, 163 formed in the opposed free ends 129 of the outlet panels 128 on the outer surfaces thereof may be formed and/or coated with braze clad material or, alternatively, a brazing shim (not shown) may be arranged between the adjacent outer surfaces of the inlet panels 126 and outlet panels 128 to ensure that the inlet and outlet panels 126, 128 of adjacent heat exchanger modules 116 are interconnected when the stack of alternating first and second plates 120, 122 are brazed together to form the interconnected inlet and outlet manifolds 166, 168. Accordingly, the localized areas surrounding the fluid openings 160, 161 on the outer surfaces of the inlet panels 126 and the localized areas surrounding the fluid openings 162, 163 on the outer surfaces of the outlet panels 128 effectively define inlet manifold contact regions 165 and outlet manifold contact regions 169. In some example embodiments, the inlet manifold contact regions 165 and outlet manifold contact regions 169 may be in the form of bosses that extend slightly out of the plane of the central portion 150 of the inlet and outlet panels 126, 128.

Therefore, for manufacturing purposes, a series of planar first and second plates 120, 122 can be arranged in an alternating stack to form a series of stacked heat exchanger modules 116 with brazing shims being positioned between the first plate 120 of one heat exchanger module 116 and the second plate 122 of the adjacent heat exchanger module 116 in the localized areas surrounding the fluid openings 160, 161, 162, 163 in the inlet and outlet panels 126, 128. Once the stack of plates 120, 122 is brazed together to form the enclosed fluid passages 124, the plurality of individual heat exchanger modules 116 are stacked one on top of the other and are only interconnected at the corresponding free ends 127, 129 of the first and second branches 126(1), 126(2), 128(1), 128(2) of the aligned inlet and outlet panels 126, 128. However, since first and second branches 126(1), 126(2), 128(1), 128(2) of the inlet and outlet panels 126, 128 include compliant regions extending between their respective free ends 127, 129 of the corresponding joining portions 142, 143, the individual heat exchanger modules 116 can be spaced apart from each other, post-brazing, in order to form gaps 170 therebetween for receiving the individual battery cell containers 112. More specifically, as a result of the arrangement of gaps 144, 146 separating the inlet and outlet panels 126, 128 from the main section 132 of the plates 120, 122 and due to the inherent flexibility and/or compliant nature of the inlet and outlet panels 126, 128, the first and second branches 126(1), 126(2), 128(1), 128(2) of the inlet and outlet panels 126, 128 can be independently bent, curved or flexed with respect the corresponding joining portion 142, 143 and the interconnected free ends 127, 129 of the inlet and outlet panels 126, 128 so as to spread apart the main generally planar sections 130 of the individual heat exchanger modules 116 with respect to each other to provide adequate spaces or gaps 170 between the individual heat exchanger modules 116 to accommodate the individual battery cell containers 112. As shown most clearly in FIGS. 7-9, the inlet panels 126 are bent or curved out of the plane of the main section 130 of the heat exchanger module 116 such that the first branch 126(1) extends above or out of the plane of the main section 130 in a first direction while the second branch 126(2) extends below or out of the plane of the main section 130 in a second direction that is generally opposite to the first direction associated with the first branch 126(1). Similarly, the outlet panels 128 of the individual modules 116 are bent or curved out of the plane of the main section 130 of the plates 120, 122 such that the first branch 128(1) extends below or out of the plane of the main section 130 in the second direction, while the second branch 128(2) extends above or out of the plane of the main section 130 in the first direction generally opposite to the second direction associated with the first branch 128(1). Accordingly the inlet and outlet panels 126, 128 of adjacent heat exchanger modules 116 which are fixed together at their respective ends allow the heat exchanger 114 to be expanded in an accordion-like manner in order to create spaces or gaps 170 between the heat exchanger 114 while the main sections 130 and joining portions 142, 143 of the individual heat exchanger modules 116 remain generally planar and in the same plane as each other so as to provide an adequate contact surface over the main section 30 of the individual heat exchanger modules 116 for contacting the corresponding generally planar surface of the battery cell container 12.

As with the previously described embodiment, manufacturing and/or assembly of the heat exchanger 114 is facilitated since relatively easy to manufacture stamped or rolled planar first and second plates 120, 122 can be used and arranged in an appropriate stack without requiring spacers and/or more complex boss or manifold structures in order to interconnect and space apart the various plate pairs. Instead, the stack of planar first and second plates 120, 122 can be brazed together as a result of the one-sided braze clad material and the use of brazing shims, for example, or any other suitable means to form an interconnected stack of heat exchanger modules 116. The stack of heat exchanger modules 116 can then be expanded, post-brazing in an accordion-like manner to provide adequate spacing between the heat exchanger modules 116 to accommodate battery cell containers 12. By providing inlet and outlet panels 126, 128 having both first and second branches 126(1), 126(2), 128(1), 128(2), the heat exchanger modules 116 can be spaced apart from each other post-brazing as much or as little as is needed in order to accommodate a variety of battery cell containers 12. Accordingly, heat exchanger 114 is not necessarily limited to a particular size of battery cell container 12. Furthermore, since the stack of interconnected heat exchanger modules 116 is interconnected by the first and second branches 126(1), 126(2), 128(1), 128(2) of the inlet and outlet panels 126, 128, the heat exchanger 114 can be formed with as many heat exchanger modules 116 as is required for a particular application, unlike the previously described embodiment where the total number of heat exchanger modules 16 is limited by the actual size of the inlet and outlet panels 126, 128 associated with each of the modules 16. In the subject embodiment, since the inlet panels and outlet panels 126, 128 of adjacent heat exchanger modules 116 are connected together at opposite ends of the inlet and outlet panels 126, 128, the spacing between the modules 116 corresponds to the distance by which the first or second branch of the inlet and/or outlet panel 126, 128 is bent or curved out of the plane of the main section 130 of two adjacent modules 116. Accordingly, the total spacing or gap 170 created between adjacent heat exchange modules 116 does not depend on or is unaffected by the total number of heat exchanger modules 116 in the stack. Therefore heat exchanger 114 provides a degree of flexibility in the sense that it can be adapted to accommodate as few or as many heat exchanger modules 116 as is required for a particular application.

While various exemplary embodiments of the heat exchanger have been described, it will be understood that certain adaptations and modifications of the described exemplary embodiments can be made as construed within the scope of the present disclosure. Therefore, the above discussed embodiments are considered to be illustrative and not restrictive.

What is claimed is:

1. A heat exchanger for a battery unit, the heat exchanger comprising:
   a plurality of heat exchanger modules each defining an internal flow passage, the heat exchanger modules each comprising:
   a generally planar main section;
   an inlet panel defining an inlet manifold contact region and defining an internal inlet fluid passage in fluid communication with said internal flow passage of said main section; and
   an outlet panel defining an outlet manifold contact region and defining an internal outlet flow passage in fluid communication with said internal flow passage of said main section;
   the inlet and outlet panels each being joined to the main section of the heat exchanger module by a respective joining portion;
   wherein the inlet and outlet panels of adjacent heat exchanger modules in said plurality of heat exchanger modules are arranged in alignment with the inlet panels being interconnected at their respective inlet manifold contact regions, the internal inlet fluid passages of adjacent heat exchanger modules therefore being in fluid communication with each other, and with the outlet panels being interconnected at their respective outlet manifold contact regions, the internal outlet fluid passages of adjacent heat exchanger modules therefore being in fluid communication with each other; and
   wherein the inlet panels and outlet panels have a first position wherein the inlet and outlet panels are generally planar and extend in the same plane as said main section and a second position wherein said inlet and outlet panels extend out of the plane of said main section thereby spacing apart the main sections of adjacent heat exchanger modules forming gaps therebetween.

2. The heat exchanger as claimed in claim 1, wherein each heat exchanger modules comprises a pair of mating first and second plates each defining a central generally planar portion surrounded by a peripheral flange, the central generally planar portions of said first and second plates being spaced apart from each other when said plates are arranged in face-to-face mating relationship, the internal flow passage being defined between said spaced apart central generally planar portions.

3. The heat exchanger as claimed in claim 2, wherein said central generally planar portions of said first and second plates are formed with inwardly disposed ribs, the inwardly disposed ribs on the first plate mating with the corresponding inwardly disposed ribs on said second plate, the mating inwardly disposed ribs dividing said internal flow passage into a plurality of generally parallel individual internal flow passages each of which is in fluid communication with said internal inlet fluid passage of said inlet panel of the corresponding heat exchanger modules and said internal fluid outlet passage of said outlet panel of the corresponding heat exchanger module.

4. The heat exchanger as claimed in claim 2, wherein said first and second plates are formed from one-sided braze clad material.

5. The heat exchanger as claimed in claim 1, wherein said inlet panels and said outlet panels are separated from said main section by respective gaps extending therebetween.

6. The heat exchanger as claimed in claim 1, wherein said inlet and outlet panels each extend between a free end and a fixed end, the free end of said inlet panels defining said inlet manifold contact regions and said free end of said outlet panels defining said outlet manifold contact regions and wherein said fixed end forms said joining portion interconnecting said inlet and outlet panels to said main section.

7. The heat exchanger as claimed in claim 6, wherein said inlet panels and said outlet panels each comprise a pair of fluid openings formed in said free ends of said panels, the inlet manifold contact regions and said outlet manifold contact regions surrounding said fluid openings.

8. The heat exchanger as claimed in claim 1, wherein:

said inlet and outlet panels each extend between a pair of free ends, the free ends of said inlet panels and outlet panels defining, respectively, first and second inlet manifold contact regions and first and second outlet manifold contact regions; and wherein the joining portion of each of said inlet panels and outlet panels is arranged intermediate said pair of free ends forming first and second branches of said inlet and outlet panels.

9. The heat exchanger as claimed in claim 8, wherein:

the first and second branches of each of said inlet panels together define compliant regions wherein one of said first and second branches extends out of the plane of the main section of the heat exchanger module in a first direction with respect to the main section, the other of the first and second branches extending in a second direction with respect to the main section that is generally opposite to said first direction when said inlet panels are in said second position; and the first and second branches of each of said outlet panels together define compliant regions wherein one of said first and second branches extends out of the plane of the main section of the heat exchanger module in a first direction with respect to the main section, the other of the first and second branches extending in a second direction with respect to the main section that is generally opposite to said first direction when said outlet panels are in said second position.

10. The heat exchanger as claimed in claim 9, wherein said inlet panels each comprise a fluid inlet opening in fluid communication with said internal inlet fluid passage for delivering an incoming heat exchange fluid into the heat exchanger module and a fluid outlet opening in fluid communication with said internal inlet fluid passage for transmitting said incoming heat exchange fluid to an adjacent heat exchanger module, said fluid inlet opening and said fluid outlet opening being arranged at respective opposed free ends of said inlet panels; and wherein said outlet panels each comprise a fluid inlet opening in fluid communication with said internal outlet fluid passage for receiving the outgoing heat exchange fluid from an adjacent heat exchanger module and a fluid outlet opening in fluid communication with said internal inlet fluid passage for transmitting outgoing heat exchange fluid from the heat exchanger module to an adjacent heat exchanger module, said fluid inlet opening and said fluid outlet opening being arranged at respective opposed free ends of said outlet panels.

11. The heat exchanger as claimed in claim 10, wherein:

the inlet and outlet panels each have a first and second generally opposed spaced apart surface, the internal fluid inlet passages and internal fluid outlet passages being formed therebetween;

the fluid inlet openings of said inlet panels are formed in the first surface of said inlet panels at one free manifold end thereof and wherein said fluid outlet openings are formed in the second surface of said inlet panels at the other free manifold end thereof; and wherein the fluid inlet openings of said outlet panels are formed in the second surface of said outlet panels at one free manifold end thereof and wherein said fluid outlet openings are formed in the first surface of said outlet panels at the other free manifold end thereof.

12. The heat exchanger as claimed in claim 11, wherein the fluid inlet and outlet openings of said inlet and outlet panels in adjacent heat exchanger modules are alternatingly arranged at opposite free manifold ends with respect to the preceding heat exchanger module.

13. A battery unit comprising:

a plurality of battery cell containers; and a heat exchanger having a plurality of heat exchanger modules each defining an internal flow passage, each heat exchanger module being interleaved between adjacent battery cell containers and comprising:

a generally planar main section;

an inlet panel defining an inlet manifold contact region and an internal inlet fluid passage in fluid communication with said internal flow passage of said main section; and an outlet panel defining an outlet manifold contact region and an internal outlet flow passage in fluid communication with said internal flow passage of said main section;

the inlet and outlet panels each being joined to the main section of the heat exchanger module by a joining portion;

wherein the inlet and outlet panels of adjacent heat exchanger modules are arranged in alignment with the inlet panels being interconnected at their respective inlet manifold contact regions and with the internal inlet fluid passages of adjacent heat exchanger modules being in fluid communication with each other, the outlet panels being interconnected at their respective outlet manifold contact regions with the internal outlet fluid passages being in fluid communication with each other; and wherein the inlet and outlet panels of each heat exchanger module each extend between the respective inlet and outlet manifold contact regions and the corresponding joining portion of the inlet and outlet panels, the inlet and outlet panels having a first position wherein the inlet and outlet panels are generally planar and extend in the same plane as said main section of the heat exchanger module and a second position wherein the inlet and outlet panels extend out of the plane of said main section of the heat exchanger module thereby spacing apart the main sections of adjacent heat exchanger modules forming gaps therebetween for receiving respective ones of said plurality of battery cell containers.

14. The battery unit as claimed in claim 13, wherein each heat exchanger module comprises a pair of mating first and second plates each defining a central generally planar portion surrounded by a peripheral flange, the central generally planar portions of said first and second plates being spaced apart from each other when said plates are arranged in face-to-face mating relationship, the internal flow passage being defined between said spaced apart central generally planar portions, the first and second plates further comprising inlet and outlet panels separated from said central generally planar portions by respective gaps extending therebetween and connected to the central generally planar portion by said joining portions, the inlet and outlet panels each defining a central portion surrounded by a peripheral flange.

15. The battery unit as claimed in claim 13, wherein said inlet and outlet panels each extend between a free end and a fixed end, the free end of said inlet panels defining said inlet manifold contact regions and said free end of said outlet panels defining said outlet manifold contact regions and wherein said fixed ends form said joining portions interconnecting said inlet and outlet panels to said main section, the interconnected inlet manifold contact regions and outlet manifold contact regions thereby defining respective inlet and outlet manifolds for inletting and discharging a common heat exchange fluid to and from said heat exchanger.

16. The battery unit as claimed in claim 13, wherein:
said inlet and outlet panels each extend between a pair of free manifold ends, the free ends of said inlet panels and outlet panels respectively defining first and second inlet manifold contact regions and first and second outlet manifold contact regions; and
wherein the joining portion of each of said inlet panels and outlet panels is arranged intermediate said pair of free manifold ends forming first and second branches of said inlet and outlet panels, the first and second branches of each of said inlet panels together defining compliant regions; and
wherein one of said first and second branches extends out of the plane of the main section of the heat exchanger module in a first direction with respect to the main section, the other of the first and second branches extending in a second direction with respect to the main section that is generally opposite to said first direction when said inlet panels are in said second position;
the first and second branches of each of said outlet panels together defining compliant regions, the first and second branches extending in opposite directions to each other on either side of said joining portion, and wherein one of said first and second branches extends out of the plane of the main section of the heat exchanger module in a first direction with respect to the main section, the other of the first and second branches extending in a second direction with respect to the main section that is generally opposite to said first direction when said outlet panels are in said operable position.
wherein the interconnected first and second inlet manifold contact regions and interconnected first and second outlet manifold contact regions define respective inlet and outlet manifolds for inletting and discharging a common heat exchange fluid to and from said heat exchanger.

17. A method of assembling a heat exchanger comprising:
providing a plurality of substantially planar heat exchanger modules that each define an internal flow passage, each heat exchanger module comprising:
a generally planar main section;
an inlet panel; and
an outlet panel;
the inlet and outlet panels being joined to the main section of the heat exchanger module by a joining portion;
an internal inlet fluid passage formed in said inlet panel in fluid communication with said internal flow passage;
an internal outlet fluid passage formed in said outlet panel in fluid communication with said internal flow passage;
wherein said inlet panel extends between said joining portion and a corresponding free end of the inlet panel, and wherein said outlet panel extends between said joining portion and a corresponding free end of the outlet panel;
wherein each inlet panel and outlet panel comprises a fluid inlet opening and a fluid outlet opening formed therein for establishing fluid communication between adjacent inlet panels and adjacent outlet panels;
arranging said plurality of substantially planar heat exchanger modules in a stack with the inlet panels and outlet panels of adjacent heat exchanger modules being in alignment such that the fluid outlet openings of one heat exchanger module are aligned with the fluid inlet openings of the adjacent heat exchanger module providing fluid communication therebetween;
brazing together the inlet panels and outlet panels of said plurality of substantially planar heat exchanger modules in a localized area establishing fluid communication between said heat exchanger modules while the main sections of said heat exchanger modules remain unbounded;
manipulating said inlet and outlet panels post-brazing so as to space apart the generally planar main sections of adjacent heat exchanger modules forming gaps therebetween.

18. The method as claimed in claim 17, wherein each heat exchanger module comprises a pair of mating first and second plates each defining a central generally planar portion surrounded by a peripheral flange, the central generally planar portions of said first and second plates being spaced apart from each other when said plates are arranged in face-to-face mating relationship, the internal flow passage being defined between said spaced apart central generally planar portions, the first and second plates further comprising inlet and outlet panels separated from said central generally planar portions by respective gaps extending therebetween and connected to the central generally planar portion by said joining portions, the inlet and outlet panels each defining a central portion surrounded by a peripheral flange.

19. The method as claimed in claim 18, wherein brazing shims are arranged between adjacent inlet panels and adjacent outlet panels in said stack; and wherein the first and second plates are formed of one-sided braze clad material.

20. The method as claimed in claim 18, wherein said inlet and outlet panels are manipulated by bending and/or flexing the inlet and outlet panels out of the plane of the main portions of said heat exchanger modules forming gaps for receiving battery cell containers therebetween.

* * * * *